US009821613B2

(12) United States Patent
Patterson et al.

(10) Patent No.: US 9,821,613 B2
(45) Date of Patent: Nov. 21, 2017

(54) TRANSMITTING DEVICE WITH ANTENNA

(71) Applicant: Bendix Commercial Vehicle Systems LLC, Elyria, OH (US)

(72) Inventors: Robert G Patterson, Burnaby (CA); Shawn D Lammers, Delta (CA)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 132 days.

(21) Appl. No.: 14/803,641

(22) Filed: Jul. 20, 2015

(65) Prior Publication Data
US 2017/0021680 A1    Jan. 26, 2017

(51) Int. Cl.
*B60C 23/00* (2006.01)
*B60C 23/04* (2006.01)
*H04W 52/24* (2009.01)
*H04W 84/18* (2009.01)

(52) U.S. Cl.
CPC .......... *B60C 23/0433* (2013.01); *B60C 23/04* (2013.01); *B60C 23/0452* (2013.01); *H04W 52/246* (2013.01); *H04W 84/18* (2013.01)

(58) Field of Classification Search
CPC . B60C 23/0433; H04W 52/246; H04W 84/18
USPC .............. 340/441–447, 539.1, 539.11, 425.5
See application file for complete search history.

(56) References Cited

U.S. PATENT DOCUMENTS

| | | | |
|---|---|---|---|
| 6,693,593 B1 * | 2/2004 | Burgess | H01P 1/047 |
| | | | 343/700 MS |
| 7,196,618 B2 | 3/2007 | Chen | |
| 7,421,902 B2 | 9/2008 | Sheikh-Bahaie | |
| 7,460,070 B2 | 12/2008 | Chen | |
| 7,728,776 B2 | 6/2010 | Lin | |
| 7,847,736 B2 | 12/2010 | Channabasappa | |
| 8,072,335 B2 | 12/2011 | Duzdar | |

(Continued)

FOREIGN PATENT DOCUMENTS

WO    WO2012030321 A1    3/2012

OTHER PUBLICATIONS

Alain Gaillard, "International Search Report and Written Opinion," Report, dated Sep. 30, 2016, 11 pages, European Patent Office, Netherlands.

(Continued)

*Primary Examiner* — Daryl Pope
(74) *Attorney, Agent, or Firm* — Cheryl L. Greenly; Brian E. Kondas; Eugene E. Clair

(57) ABSTRACT

Various examples of a transmitting device with an antenna are disclosed. In one example, a transmitting device comprises a planar circuit board; a sensor mounted on the planar circuit board; a transmitter mounted on the planar circuit board and in communication with the sensor, the transmitter configured to periodically transmit signals containing a plurality of packets; and an antenna mounted on the planar circuit board and in electrical communication with the transmitter for transmitting the signals containing the plurality of packets. The antenna comprises a first end connected to the planar circuit board and a first support section; a meander line section connected to the first support section and a second support section and lying in a plane parallel with the circuit board; a second end connected to the second support section and an electrical ground.

17 Claims, 3 Drawing Sheets

(56) References Cited

U.S. PATENT DOCUMENTS

| | | |
|---|---|---|
| 9,070,069 B2 | 6/2015 | Sinnett |
| 2006/0097870 A1 | 5/2006 | Choi |
| 2006/0273890 A1 | 12/2006 | Kontegeorgakis |
| 2007/0114889 A1 | 5/2007 | Cobianu |
| 2013/0167999 A1 | 7/2013 | Nakatani |
| 2014/0210607 A1 | 7/2014 | Patterson |

OTHER PUBLICATIONS

Bendix Commercial Vehicle Systems LLC, "SmarTire Tire Pressure Monitoring System Operator's Manual," manual, Apr. 2015, 80 pages, Bendix Commercial Vehicle Systems LLC, Elyria Ohio USA.

* cited by examiner

US 9,821,613 B2

TRANSMITTING DEVICE WITH ANTENNA

BACKGROUND

The present invention relates to embodiments of a transmitting device with an antenna, such as used in tire pressure sensing and other wireless vehicle sensing systems. Conventional tire pressure sensors are installed within tires of the vehicle or on a valve stem and include radio frequency (RF) transmitters. The sensors transmit periodic signals indicating tire conditions (e.g., pressure, temperature, etc.) of the respective tires of the vehicle. Receiving antennas placed at multiple locations throughout the vehicle receive the tire condition signals from the various transmitters.

A tire pressure monitoring system, such as used on a commercial vehicle, may include multiple receiving antennas since the tire pressure sensors may be separated by large distances from each other. Signals from tire pressure sensors located within the pressurized tire may suffer from attenuation as the signal passes through the tire sidewalls. The antenna may also be detuned based on its proximity to the edge of a rim inside a steel belted tire. In addition, the attenuation of the signal affects the number of receiving antennas required on the vehicle. There is a need for an improved transmitting device to address these issues.

SUMMARY

An example of a transmitting device comprises a planar circuit board; a sensor mounted on the planar circuit board; a transmitter mounted on the planar circuit board and in communication with the sensor, the transmitter configured to periodically transmit signals containing a plurality of packets; and an antenna mounted on the planar circuit board and in electrical communication with the transmitter for transmitting the signals containing the plurality of packets. The antenna comprises a first end connected to the planar circuit board and a first support section; a meander line section connected to the first support section and a second support section and lying in a plane parallel with the circuit board; a second end connected to the second support section and an electrical ground.

In accordance with another aspect, a system for monitoring a condition on a vehicle comprises a plurality of transmitting devices, each of the plurality of transmitting devices comprising: a planar circuit board; a sensor mounted on the planar circuit board; a transmitter mounted on the planar circuit board and in communication with the sensor, the radio transmitter configured to periodically wirelessly transmit signals containing the plurality of packets; and an antenna mounted on the planar circuit board and in communication with the transmitter for transmitting the signals. The antenna comprises a first end connected to the planar circuit board and a first support section; a meander line section connected to the first support section and a second support section; a second end connected to the second support section and a ground. The system comprises a single receiver for receiving the plurality of packets from the plurality of transmitting devices.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
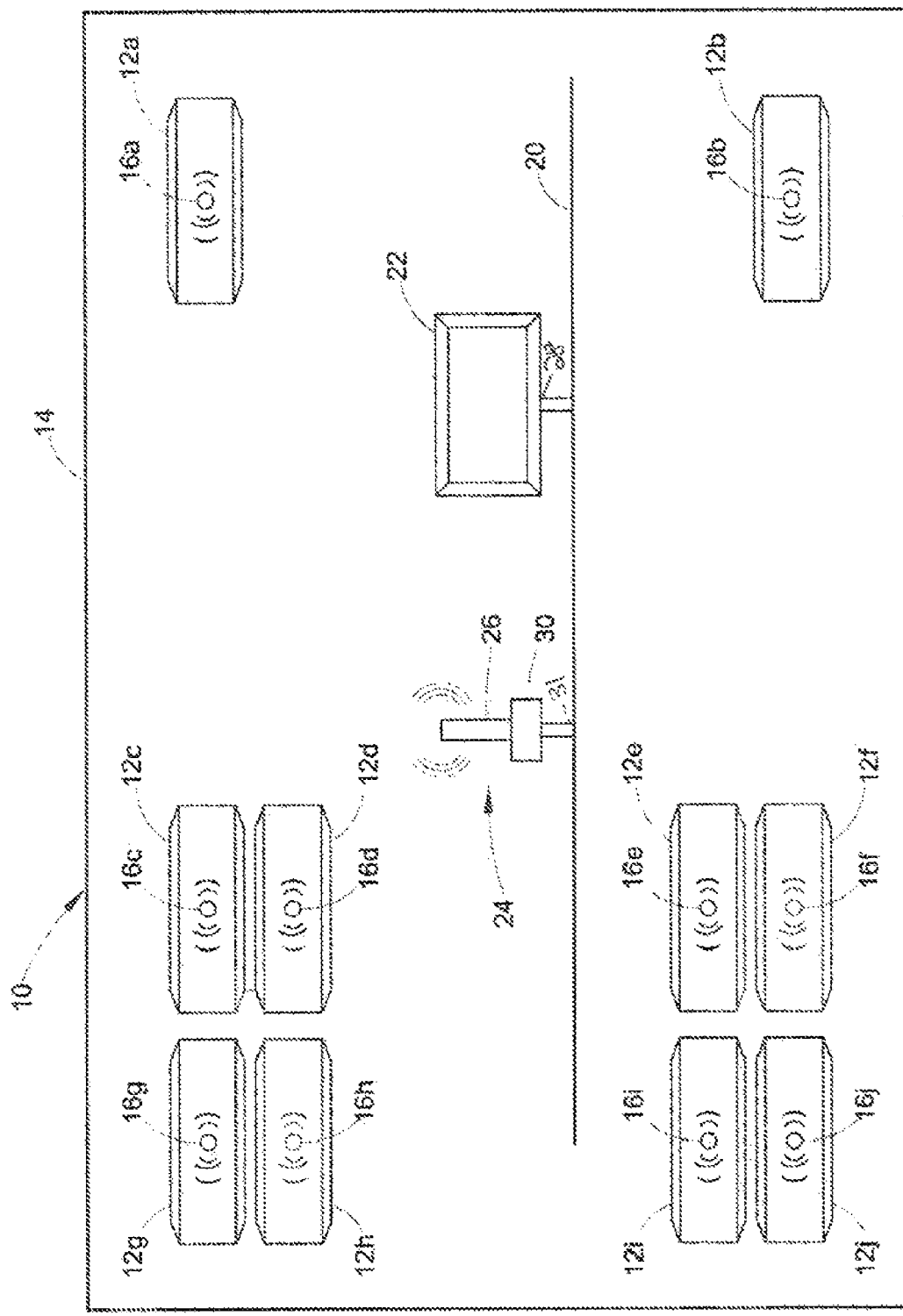
FIG. 1 illustrates a schematic representation of a system, such as a tire pressure monitoring system, including the transmitting devices according to an example of the present invention.

With reference to FIG. 1, a vehicle sensor system 10, such as a tire pressure monitoring system, is illustrated on a vehicle 14. The vehicle 14, a tractor or a truck, generally has at least six wheel locations and at least six tires. The wheel locations include right front, right mid, right rear, left front, left mid and left rear. The right mid, right rear, left mid and left rear wheel locations may include an inner and an outer wheel location, if dual tires are placed at these locations. A sample tire placement is illustrated in FIG. 1 with tire 12a at the left front, tire 12b at the right front, tire 12c at the outer left mid, tire 12d at the inner left mid, tire 12e at the inner right mid, tire 12f at the outer right mid, tire 12g at the outer left rear, tire 12h at the inner left rear, tire 12i at the inner right rear, and tire 12j at the outer right rear. The tires 12a, 12b, 12c, 12d, 12e, 12f, 12g, 12h, 12i, 12j may be steel belted tires. Additional or fewer tires are contemplated. Alternatively, the vehicle 14 can be a trailer with at least four wheel locations.

Each tire in the vehicle sensor system 10 includes a transmitting device, illustrated by transmitting devices 16a, 16b, 16c, 16d, 16e, 16f, 16g, 16h, 16i, 16j. The transmitting devices 16a, 16b, 16c, 16d, 16e, 16f, 16g, 16h, 16i, 16j can be tire pressure sensors. The transmitting devices 16a, 16b, 16c, 16d, 16e, 16f, 16g, 16h, 16i, 16j can be mounted on the rim inside the respective tires 12a, 12b, 12c, 12d, 12e, 12f, 12g, 12h, 12i, 12j. The transmitting devices 16a, 16b, 16c, 16d, 16e, 16f, 16g, 16h, 16i, 16j monitor tire characteristic information, such as the tire pressure, tire temperature, vehicle load and tire vibration.

Each transmitting device 16a, 16b, 16c, 16d, 16e, 16f, 16g, 16h, 16i, 16j comprises a wireless transmitter that periodically transmit signals containing packets of data with the sensor information and a unique sensor identification code (ID) in a selected data transmission format. The format of the signals can be a standard or a proprietary radio frequency (RF) protocol. The transmitting device 16a, 16b, 16c, 16d, 16e, 16f, 16g, 16h, 16i, 16j can also be configured to transmit signals upon rotation of the tire or when there is a tire pressure alert event.

The vehicle sensor system 10 includes a wireless receiver 24. The wireless receiver 24 includes an antenna 26, a processing unit 30 and a communication port 31. The wireless receiver 24 wirelessly receives the signals containing the data packets in the selected data format from the transmitting devices 16a, 16b, 16c, 16d, 16e, 16f, 16g, 16h, 16i, 16j. The wireless receiver 24 decodes the tire characteristic information from the selected data transmission format to a tire characteristic message capable of being communicated on a serial communication bus 20. The format of the tire characteristic message may be a standard protocol, such as SAE J1939, or a proprietary protocol. The wireless receiver 24 is capable of communicating at least one tire characteristic message over the serial communication bus 20 via the communication port 31. The tire characteristic message can include, but is not limited to, information such as the instantaneous tire pressure, the comparison of the tire pressure against a tire pressure limit, motion value, temperature and the unique sensor ID, for example.

For this particular vehicle sensor system 10 with transmitting devices 16a, 16b, 16c, 16d, 16e, 16f, 16g, 16h, 16i, 16j, only one receiving antenna 26 is necessary as the transmitting devices 16a, 16b, 16c, 16d, 16e, 16f, 16g, 16h, 16i, 16j suffer from less attenuation, as will be described. In one example, the attenuation of a signal containing the data packets from a transmitting device through a steel belted tire, for example, is less than 5 dB.

The vehicle sensor system 10 includes a controller 22. The controller 22 can be a stand-alone controller or include functionality for controlling the antilock braking system in addition to tire pressure monitoring. The controller 22 includes a communication port 28 for communicating with the serial communication bus 20 on the vehicle 10. Controller 22 may communicate with other controllers on the vehicle 10 using the serial communication bus 20. Alternatively, controller 22 may communicate wirelessly with other controllers on the vehicle 10 or with an off-board communication device. The messages received and transmitted on the bus 20 can be in a standardized serial communication bus format, such as SAE J1939, or in a proprietary format. In an alternative embodiment, the wireless receiver 24 is integrated with the controller 22.

In accordance with one example, a system for monitoring a condition on a vehicle comprises a plurality of transmitting devices, each of the plurality of transmitting devices configured to periodically transmit a plurality of signals containing data packets. The system includes a single receiving antenna for receiving the plurality of signals from the plurality of transmitting devices.

Figure 2:
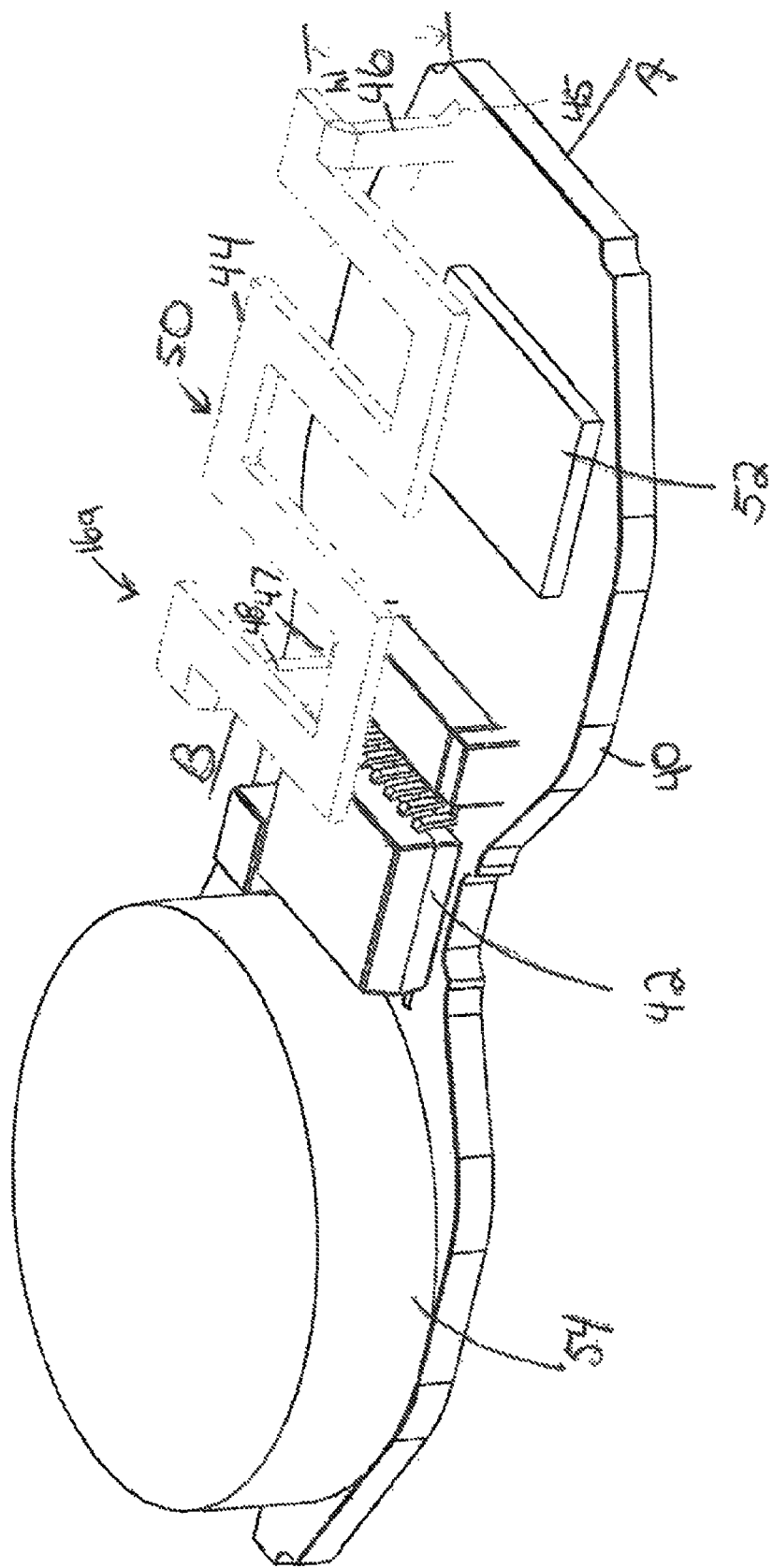
FIG. 2 illustrates a transmitting device with an antenna according to an example of the present invention.

In FIG. 2, an example of a transmitting device, such as transmitting device 16a, according to the invention is shown. The transmitting device 16a includes a planar circuit board 40. The planar circuit board 40 is located in a plane A. The planar circuit board 40 includes an electrical ground.

A sensor 42 is mounted on the planar circuit board 40. In one example, the sensor 42 is capable of detecting the pressure inside the tire 12a of the vehicle 14. In another example, the sensor 42 is capable of detecting the pressure and the temperature inside the tire 12a. In another example, the sensor 42 may be a vibration sensor or an optical sensor. The sensor 42 includes a processor to form the captured tire information into data packets.

A transmitter 52 is mounted on the planar circuit board 40. The transmitter 52 is in electrical communication with the sensor 42. In one example, the transmitter 52 is integrated with the sensor 42. The transmitter 52 is configured to convert the plurality of data packets from the sensor 42 into a carrier frequency and modulate the signal according to on-off keying (OOK) or frequency shift keying (FSK). The transmitter 52 periodically transmits the signal containing the plurality of data packets. The transmitter 52 is capable of transmitting signals periodically at a frequency of between about 300 MHz and about 500 MHz. In one example, the transmitter 52 is capable of transmitting at about 433 MHz. Due to the design of this transmitting device 16a, the transmitter 52 will transmit about five data packets each period, wherein each period is about 500 ms. The design of the present transmitting device 16a reduces redundancy in data packet transmission that was required in the prior art sensors. This transmission data rate conserves power of the transmitting device 16a. The transmitter 52 may use on-off keying (OOK) at a higher baud rate when transmitting to further conserve power of the transmitting device 16a.

In addition, the sensor 42 may monitor the ambient temperature. When the measured ambient temperature is less than a temperature threshold, the sensor 42 switches the transmitter 52 to a lower transmission power, thereby lowering the current draw. In one example, the temperature threshold is about −20° C.

A power source 54 is mounted on the planar circuit board 40. The power source 54 may be a battery. The power source 54 powers the sensor 42 and the transmitter 52. In another example, the power source 54 can be mounted separately from the planar circuit board 40 while still being electrically connected to the sensor 42 and the transmitter 52.

An antenna 50 is mounted on the planar circuit board 40 and spaced apart from the power source 54. The antenna 50 is in electrical communication with the transmitter 52 for wirelessly transmitting the plurality of data packets. The antenna 50 comprises a first end 45 connected to transmitter 52 via the planar circuit board 40. The first end 45 is connected to a first support section 46. The first support section 46 is connected to a meander line section 44. The meander line section 44 lies in a plane B, which is substantially parallel to plane A of the planar circuit board 40. In one example, the meander line section 44 comprises three U-shaped sections. In another example, the meander line section 44 comprises two U-shaped sections. Additional or fewer U-shaped sections are contemplated. The length of the meander line section 44 is maximized while remaining within an outline profile of the planar circuit board 40. The meander line section 44 is connected to a second support section 48. The second support section 48 is connected to a second end 47. In one example, the second end 47 is connected to the electrical ground on the planar circuit board 40. Grounding the antenna 50 at the second end 47 creates a loop antenna with horizontal polarization.

In one example, the first support section 46 and the second support section 48 raise the meander line section 44 a height h1 above the surface of the planar circuit board 40. In one example, the height h1 is between about three (3) and five (5) centimeters. This height is less than the height of prior art tire pressure sensors that include a helical antenna. The height h1 is approximately the same height as the power source 54. The planar circuit board 40, with all of the components mounted to the planar circuit board 40, is fitted inside of a housing (not shown). Due to the configuration of the antenna 50, the overall height of housing for the transmitting device 16a can be minimized. The improved smaller housing makes the installation of the transmitting device 16a into the tire 12a easier and the transmitting device 16a will be less prone to damage after installation. The raised meander line section 44 provides a desired radiation pattern along with a longer overall length of the antenna 50.

In one example, the antenna 50 is constructed of a metallic material. The metal material may be steel, copper or phosphor bronze. The metallic material may be plated.

The circuit board 40 may be coated with a thermoplastic elastomer coating for protection against environmental elements. Alternatively, the circuit board 40 may be installed in the housing and the housing filled with an epoxy compound for protection. Any change to a coating material or to the depth of epoxy compound in the housing affects the tuning of the antenna in the prior art tire pressure sensors. The prior art transmitting device may require several steps during manufacturing to tune the antenna. However, the design of the present antenna 50 as a loop antenna with a raised meandering portion 44 makes the transmitting device 16a less susceptible to detuning as impedance changes caused by the coating or compound materials are mitigated.

Due to the configuration of the antenna 50 as a loop antenna with one end ground, the antenna 50 is horizontally polarized. The raised meander line section 44 facilitates a focused radiation pattern and longer antenna length. Any radiation in the vertical direction is substantially decreased, thereby increasing the power in the horizontal direction. In one example, the transmitting device 16a is oriented inside the tire 12a in such a manner than the antenna 50 is substantially perpendicular to the sidewall of the tire 12a. In this manner, the antenna 50 can be in an orientation other than substantially parallel to the circuit board 40 while still being effectively horizontally polarized.

Transmitting devices 16b, 16c, 16d, 16e, 16f, 16g, 16h, 16i, 16j are configured similar to transmitting device 16a as shown in FIG. 2.

Therefore, one example of a transmitting device comprises a planar circuit board; a sensor mounted on the planar circuit board configured to sense a vehicle condition and form a plurality of data packets, the data packets including the vehicle condition; a transmitter mounted on the planar circuit board and in electrical communication with the sensor, the transmitter configured to periodically wirelessly transmit signals containing the plurality of packets; and an antenna mounted on the planar circuit board and in communication with the transmitter for transmitting the signals. The antenna comprises a first end connected to the planar circuit board and a first support section; a meander line section connected to the first support section and a second support section and lying in a plane substantially parallel with the circuit board; a second end connected to the second support section and an electrical ground.

Figure 3:
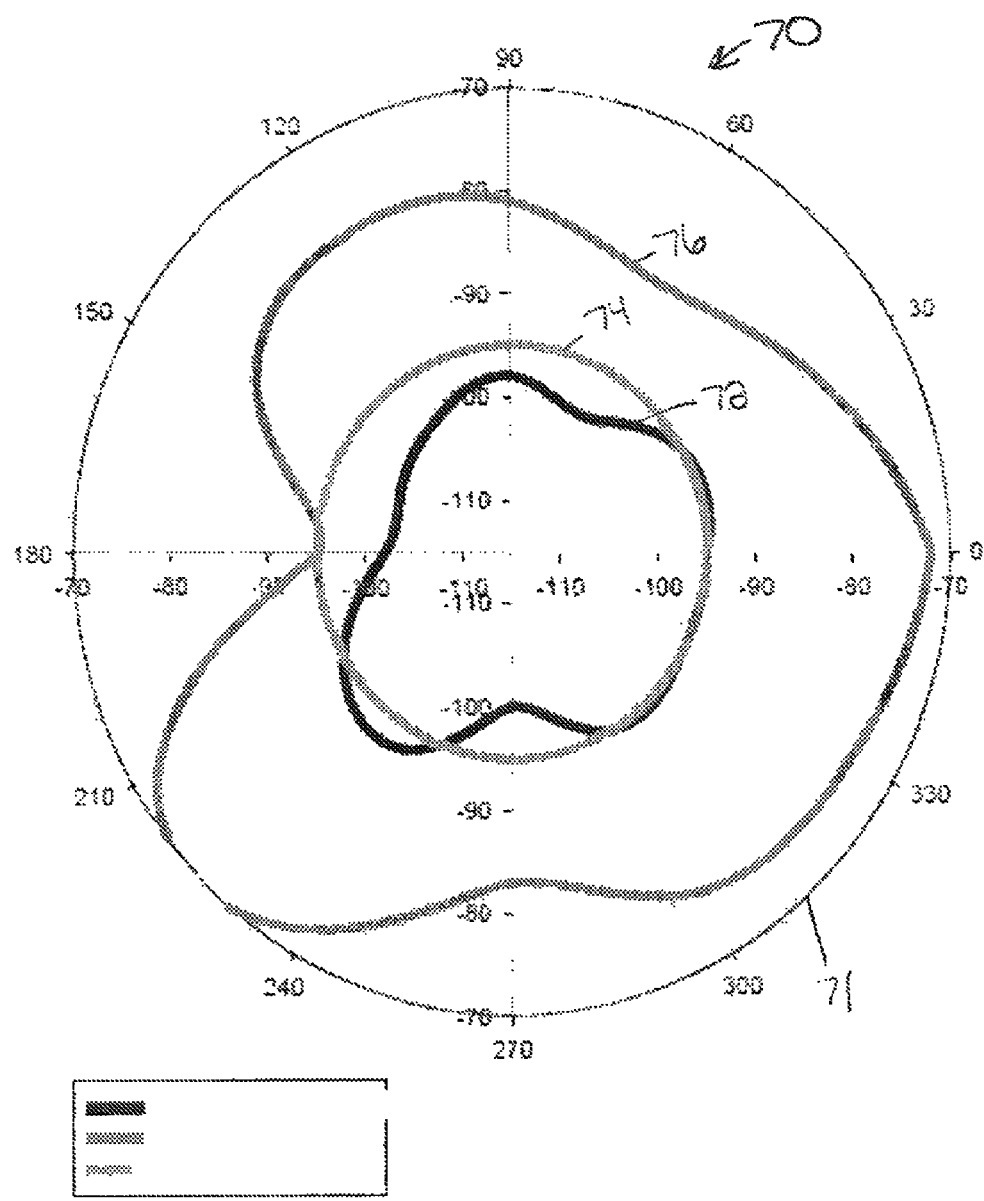
FIG. 3 illustrates a radiation plot comparing a prior art tire pressure sensor and a transmitting device according to the invention.

In FIG. 3, an example of a radiation plot 70 as measured from the outer right mid axle tire 12f on the vehicle 14 is shown. The radiation plot 70 displays the received power levels of a prior art tire pressure sensor with a helical antenna and a transmitting device with an antenna according to this invention, such as transmitting device 16f. The received power levels are measured at a receiving antenna, such as receiving antenna 26. The receiving antenna 26 may have a sensitivity limit of −115 dBm, as shown at the center of the plot 70, for example. For comparison purposes, the prior art tire pressure sensor and the transmitting device 16f are mounted inside the tire and transmitting at a frequency of about 433 MHz. Both the prior art tire pressure sensor and the transmitting device 16f are transmitting at the same power levels of 0 dBm. The outermost line 71 of the plot 70 shows the degrees of rotation of the tire at the point at which the received power level was measured. The prior art tire pressure sensor is shown as line 72 inside the plot and an example of the inventive transmitting device 16f as line 76. Line 74 shows an average limit required to be considered acceptable signal strength at the receiving antenna 26. In this instance, 20 dB gain over the −115 dBm antenna limit in all directions is considered an acceptable range such that the data packets would be reliably received by the receiving antenna 26.

Line 72 shows the received power level of a prior art tire pressure sensor. For the prior art tire pressure sensor, the transmission of the data packets does not reach the average limit line 74 in some orientations of the tire. There can be as much as 25 dB loss of the signal containing the data packets due to the orientation and type of antenna of the prior art sensor and the resulting attenuation of the signal through the steel belted tire 12a. Therefore, the data packets may not be reliably received at the receiving antenna 26 when the tire 12f is at an orientation of 180°, for example. Because of this attenuation, more than one receiving antenna will need to be located at various locations on the vehicle so that the data packets can be reliably received.

Line 76 shows the received power levels of a transmitting device 16f. As can be seen in the plot 70, the received power levels of the transmitting device 16f have a margin of about 20 dB over the average limit line 74 in most tire orientations. Even at the 180° orientation, the received power level illustrated by line 76 of the transmitting device 16f meets the average limit line 74. In this manner, the data packets from the transmitting device 16f can be reliably received by the receiving antenna 26 no matter the orientation of the tire 12f with respect to the receiving antenna 26.

With the present inventive transmitting devices 16a, 16b, 16c, 16d, 16e, 16f, 16g, 16h, 16i, 16j, data packets can be reliably received at the single antenna 26 no matter the orientation of the tires 12a, 12b, 12c, 12d, 12e, 12f, 12g, 12h, 12i, 12j or the distance of the tires 12a, 12b, 12c, 12d, 12e, 12f, 12g, 12h, 12i, 12j from the antenna 26. No increase in power transmission requirements at the transmitting devices 16a, 16b, 16c, 16d, 16e, 16f, 16g, 16h, 16i, 16j is required to achieve reliable reception of the data packets, thereby increasing the life of the transmitting device 16a, 16b, 16c, 16d, 16e, 16f, 16g, 16h, 16i, 16j. In addition, the number of data packets transmitted can be reduced because of the increase reliability of the data packets reaching the antenna 26.

In a prior art sensor, when a vehicle is stationary, the tire may be at a rotation angle where the signal is significantly attenuated, for example line 72 of FIG. 3 at the 180° tire orientation. The signal may not be received by the receiving antenna. The configuration of present antenna 50 allows for immediate readings of vehicle sensor information upon power up of the vehicle sensor system 10 because the angle of orientation of the tire does not affect the received power level of the signals received from the transmitting devices. No matter the orientation angle of the tire, the signal is great enough to be received at the receiving antenna, thereby making stationary vehicle monitoring much more reliable.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:
1. A transmitting device comprising:
a planar circuit board;
a sensor mounted on the planar circuit board configured to sense a vehicle condition and form a plurality of data packets, the data packets including the vehicle condition;
a transmitter mounted on the planar circuit board and in electrical communication with the sensor, the transmitter configured to periodically wirelessly transmit signals containing the plurality of data packets; and an antenna mounted on the planar circuit board and in electrical communication with the transmitter for transmitting signals containing the plurality of data packets, the antenna comprising:
- a first end connected to the planar circuit board and a first support section;
- a meander line section connected to the first support section and a second support section and lying in a plane substantially parallel with and vertically above the circuit board;
- a second end connected to the second support section and an electrical ground.

2. The transmitting device as in claim 1, wherein the meander line section further comprises three U-shaped sections.

3. The transmitting device as in claim 1, wherein the first and second support sections raise the meander line section of the single band antenna between about three centimeters and five centimeters from a surface of the planar circuit board.

4. The transmitting device as in claim 1, wherein the antenna comprises a plated metal.

5. The transmitting device as in claim 1, wherein the antenna is horizontally polarized.

6. The transmitting device as in claim 1, wherein the planar circuit board is coated with a material and the antenna impedance remains substantially the same as prior to the coating of the antenna.

7. The transmitting device as in claim 1, wherein the transmitter is capable of transmitting about five data packets each period, wherein each period is about five hundred milliseconds.

8. The transmitting device as in claim 1, wherein the sensor is configured for detecting the pressure of a pneumatic tire of a vehicle.

9. The transmitting device as in claim 1, wherein the transmitting devices transmits a signal at a frequency of between about 300 MHz and 500 MHz.

10. A transmitting device comprising:
- a planar circuit board;
- a sensor mounted on the planar circuit board configured to sense a vehicle condition and form a plurality of data packets, the data packets including the vehicle condition;
- a transmitter mounted on the planar circuit board and in electrical communication with the sensor, the transmitter configured to periodically wirelessly transmit signals containing the plurality of data packets;
- an antenna mounted on the planar circuit board and in electrical communication with the transmitter for transmitting signals containing the plurality of data packets, the antenna comprising:
  - a first end connected to the planar circuit board and a first support section;
  - a meander line section connected to the first support section and a second support section and lying in a plane substantially parallel with the circuit board;
  - a second end connected to the second support section and an electrical ground; and
- a control circuit in communication with the transmitter and the sensor, wherein the sensor is configured for detecting the ambient temperature and the control circuit is capable of lowering the transmission power level in response to a temperature less than a temperature threshold.

11. The transmitting device as in claim 10, wherein the temperature threshold is about −20 C.

12. A system for monitoring a condition on a vehicle comprising:
- a plurality of transmitting devices; wherein each of the plurality of transmitting devices comprises:
  - a planar circuit board;
  - a sensor mounted on the planar circuit board configured to sense a vehicle condition and form a plurality of data packets, the data packets including the vehicle condition;
  - a transmitter mounted on the planar circuit board and in communication with the sensor, the transmitter configured to periodically wirelessly transmit signals containing the plurality of data packets; and
  - an antenna mounted on the planar circuit board and in communication with the transmitter for transmitting the signals containing the plurality of data packets, the antenna comprising:
    - a first end connected to the planar circuit board and a first support section;
    - a meander line section connected to the first support section and a second support section and lying in a plane substantially parallel with and vertically above the circuit board;
    - a second end connected to the second support section and a ground; and
- a single receiver for receiving the plurality of packets from the plurality of transmitting devices; wherein the receiver receives packets from the plurality of transmitting devices.

13. The system as in claim 12, wherein the transmitting devices are located inside a pressurized portion of a plurality of tires of a vehicle.

14. The system as in claim 13, wherein the attenuation of the signal from the plurality of transmitting devices through the tires is less than 5 dB.

15. The system as in claim 13, wherein the signal containing the data packets from the plurality of transmitting devices are negligibly attenuated by the tires.

16. The system as in claim 13, wherein the transmitting devices are mounted such that the antennas are substantially perpendicular to the sidewalls of the tires.

17. A tire pressure monitoring device comprising:
- a sensor mounted inside a tire, the sensor configured for monitoring a tire condition and forming data packets containing the tire condition; and
- means for transmitting a signal containing the data packets; wherein the means for transmitting a data packet comprises:
  - an antenna mounted on the planar circuit board and in communication with the transmitter for transmitting the plurality of packets, the antenna comprising:
    - a first end connected to the planar circuit board and a first support section;
    - a meander line section connected to the first support section and a second support section and lying in a plane parallel with and vertically above the circuit board;
    - a second end connected to the second support section and an electrical ground wherein the attenuation of the signal through the tire is less than about 5 db.

* * * * *